(12) United States Patent
Romand et al.

(10) Patent No.: US 10,199,620 B2
(45) Date of Patent: Feb. 5, 2019

(54) SYSTEM FOR ATTACHING A THERMAL BATTERY TO A POWER SECTION OF AN UNDERWATER CRAFT

(71) Applicant: DCNS, Paris (FR)

(72) Inventors: Jean-François Pierre Laurent Romand, Cuers (FR); Ludovic Madier, Les Issambres (FR)

(73) Assignee: DCNS, Paris (FR)

( * ) Notice: Subject to any disclaimer, the term of this patent is extended or adjusted under 35 U.S.C. 154(b) by 358 days.

(21) Appl. No.: 14/417,054

(22) PCT Filed: Jul. 23, 2013

(86) PCT No.: PCT/EP2013/065529
§ 371 (c)(1),
(2) Date: Jan. 23, 2015

(87) PCT Pub. No.: WO2014/016303
PCT Pub. Date: Jan. 30, 2014

(65) Prior Publication Data
US 2015/0214556 A1    Jul. 30, 2015

(30) Foreign Application Priority Data
Jul. 24, 2012 (FR) .................................... 12 57156

(51) Int. Cl.
*H01M 2/10* (2006.01)
*B63G 8/08* (2006.01)
(Continued)

(52) U.S. Cl.
CPC ............ *H01M 2/1083* (2013.01); *B63G 8/08* (2013.01); *H01M 2/1016* (2013.01);
(Continued)

(58) Field of Classification Search
CPC ............ H01M 2/1016; H01M 2/1044; H01M 2/1055; H01M 2/1077; H01M 2/1083;
(Continued)

(56) References Cited

U.S. PATENT DOCUMENTS 4,152,492 A * 5/1979 McCartney ............. H01M 6/38
429/116
4,653,782 A * 3/1987 Munday ................ F16L 55/172
285/15
(Continued)

FOREIGN PATENT DOCUMENTS

| JP | 2008/034340 A | 2/2008 |
|---|---|---|
| JP | 2008/140710 A | 6/2008 |
| JP | 2011134699 A * | 7/2011 |

*Primary Examiner* — A. Dexter Tugbang
(74) *Attorney, Agent, or Firm* — Knobbe, Martens, Olson & Bear LLP

(57) ABSTRACT

A system for attaching a thermal battery to a flange of a power supply section of an underwater craft, such as a torpedo, comprising a fixing sleeve arranged around and fixed to the battery and provided with fixing lugs comprising holes for the passage of screws for attachment to the flange, wherein the sleeve is in an overall shape of a C, of which an intermediate part and ends of branches comprise the fixing lugs for fixing the fixing sleeve to the flange.

8 Claims, 2 Drawing Sheets

(51) Int. Cl.
*H01M 6/38* (2006.01)
*H01M 6/36* (2006.01)
*H01M 6/44* (2006.01)
*H01M 10/0525* (2010.01)
*A63H 23/04* (2006.01)
*F16B 13/06* (2006.01)
*H02G 3/32* (2006.01)
*F16L 23/00* (2006.01)
*B63B 21/50* (2006.01)
*F16L 3/223* (2006.01)

(52) U.S. Cl.
CPC ....... *H01M 2/1044* (2013.01); *H01M 2/1055* (2013.01); *H01M 2/1077* (2013.01); *H01M 6/36* (2013.01); *H01M 6/38* (2013.01); *H01M 6/44* (2013.01); *A63H 23/04* (2013.01); *B63B 21/50* (2013.01); *B63B 2209/00* (2013.01); *F16B 13/06* (2013.01); *F16B 13/066* (2013.01); *F16L 3/2235* (2013.01); *F16L 23/003* (2013.01); *H01M 10/0525* (2013.01); *H01M 2220/20* (2013.01); *H02G 3/32* (2013.01); *Y10T 29/49108* (2015.01); *Y10T 29/49117* (2015.01); *Y10T 29/49947* (2015.01); *Y10T 29/5313* (2015.01); *Y10T 29/53135* (2015.01)

(58) Field of Classification Search
CPC ...... H01M 6/36; H01M 6/44; H01M 10/0525; H01M 2220/10; H01M 6/38; Y10T 29/49108; Y10T 29/49117; Y10T 29/49947; Y10T 29/5313; Y10T 29/53135; B63B 2209/00; B63B 21/50; B63G 8/08; A63H 23/04; F16B 13/06; F16B 13/066; F16L 23/003; F16L 3/2235; H02G 3/32

See application file for complete search history.

(56) References Cited

U.S. PATENT DOCUMENTS

| | | | | |
|---|---|---|---|---|
| 5,736,271 | A * | 4/1998 | Cisar | H01M 2/1055 361/730 |
| 6,093,076 | A * | 7/2000 | Street | A63H 23/04 446/156 |
| 6,280,129 | B1 * | 8/2001 | Lowry | F16B 13/06 411/173 |
| 9,975,606 | B2 * | 5/2018 | Trouve | B63B 21/50 |
| 2004/0048152 | A1 * | 3/2004 | Yata | H01M 10/0525 429/162 |
| 2007/0007397 | A1 * | 1/2007 | Nelson | F16L 3/2235 248/68.1 |
| 2007/0141424 | A1 | 6/2007 | Armstrong et al. | |
| 2008/0224464 | A1 * | 9/2008 | Krausz | F16L 21/065 285/31 |
| 2008/0241625 | A1 | 10/2008 | Fujinaga | |
| 2012/0021270 | A1 * | 1/2012 | Kumar | H01M 10/0525 429/120 |

* cited by examiner

SYSTEM FOR ATTACHING A THERMAL BATTERY TO A POWER SECTION OF AN UNDERWATER CRAFT

FIELD OF THE INVENTION

The present invention relates to a system for attaching a thermal battery to a power section of an underwater craft, in particular such as a torpedo.

More particularly, the invention relates to such a system that makes it possible to ensure the attachment of a thermal battery to a corresponding flange of that power section.

BACKGROUND OF THE INVENTION

In general, the attachment systems known from the state of the art for this type of application for example comprise a sleeve arranged around and fastened on the battery and that is provided with fastening lugs provided with passage holes for screws for attaching the assembly on the flange.

However, the diameter of the battery is not known a priori because it may evolve during manufacturing thereof.

Allowances in terms of the diameter then make it necessary to use relatively complex means for reacting play, for example pads made from an elastomeric material or screw/thread systems for reacting play, etc.

Aside from the complexity and cost of producing that attachment, these systems also have a certain number of drawbacks in terms of their mechanical strength.

It is in fact known that such torpedoes, for example so-called light torpedoes, can be dropped from an aircraft and that the torpedo then undergoes a relatively significant impact when it comes into contact with the surface of the water.

Breakages of such systems for attaching batteries have thus been observed during such drops.

SUMMARY OF THE INVENTION

The invention therefore aims to resolve these problems.

To that end, the invention relates to a system for attaching a thermal battery to a flange of a power supply section of an underwater craft such as a torpedo of the type comprising a fixing sleeve arranged around and fixed to the battery and provided with fixing lugs comprising holes for the passage of screws for attachment to the flange, that and characterized in that the sleeve is in the overall shape of a C, of which the intermediate part and the ends of the branches comprise the fixing lugs for fixing this sleeve to the flange.

According to other features of the attachment system according to the invention, considered alone or in combination:
- the holes of the lugs of the C-shaped sleeve have a dimension larger than the diameter of the screws for attaching the sleeve on the flange, and
- the holes are oblong holes.

BRIEF DESCRIPTION OF THE DRAWINGS

The invention will be better understood using the following description, provided solely as an example and done in reference to the appended drawings, in which.

DETAILED DESCRIPTION OF A PREFERRED EMBODIMENT

Figure 1:
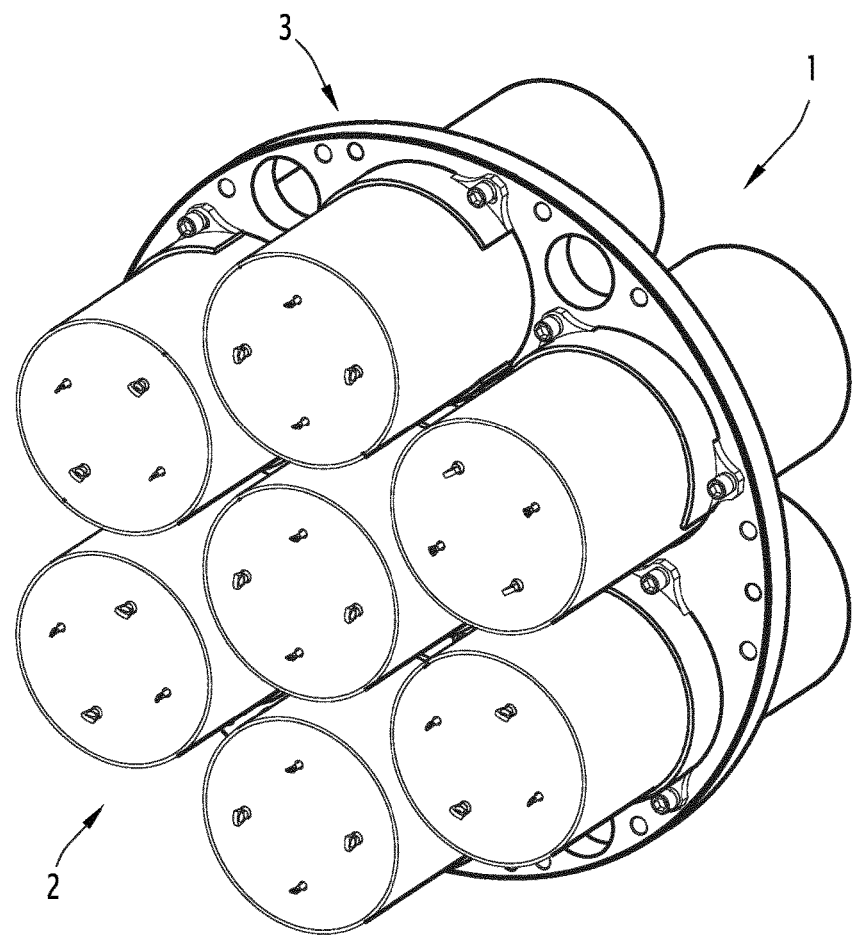
FIG. 1 shows a perspective view of a set of batteries designed to be incorporated into an electricity power supply section, for example of a torpedo.

These figures, and in particular FIG. 1, illustrate a set of thermal batteries designed to be included in the composition of a power supply section for an underwater craft such as a torpedo.

This assembly is designated by general reference 1 in this FIG. 1, and for example comprises several associated thermal batteries, one of which is designated by general reference 2 in this FIG. 1. These batteries are then attached on a flange designated by general reference 3, which in turn is attached in the electric power section of the torpedo.

This section may comprise several assemblies of this type associated with each other.

Figure 2:
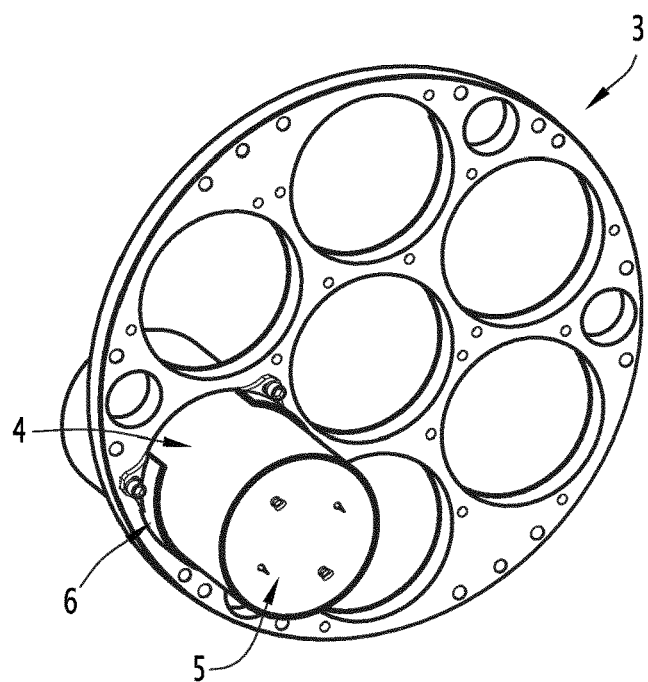
FIG. 2 shows a perspective view illustrating the attachment of a battery on a flange.

As more particularly shown in FIG. 2, the flange 3 then comprises holes, for example 4, for passage of the batteries, for example 5, each battery being attached on the flange 3 by means of an attachment sleeve, one of which is designated by general reference 6 in that figure.

That sleeve is then on the one hand placed around and attached on the battery 5, and on the other hand attached by screwing on the flange 3, and then for example to that end comprises attaching lugs provided with passage holes for attaching screws.

Figure 3:
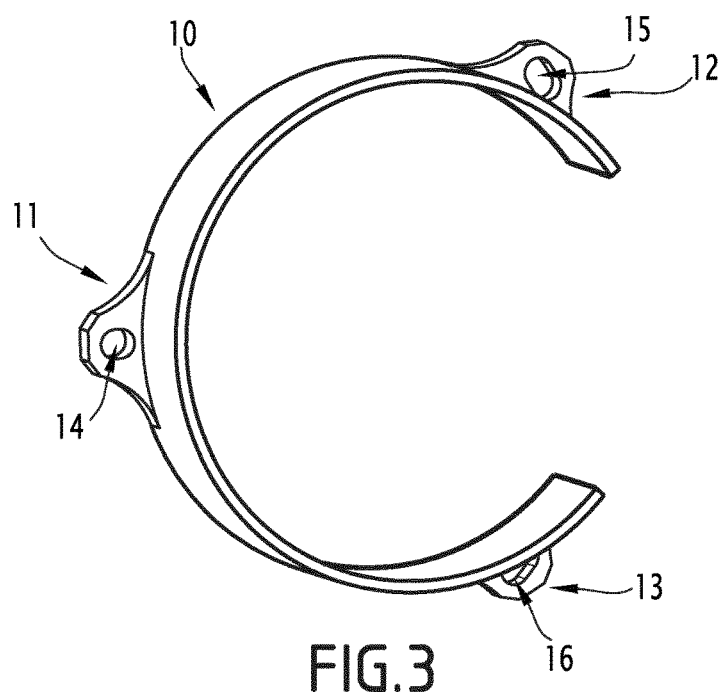
FIG. 3 shows a perspective view of one embodiment of a sleeve for attaching that battery on that flange.

FIG. 3 provides a more detailed illustration of one example embodiment of such a sleeve.

In that FIG. 3, the sleeve is designated by general reference 10 and is in the general shape of a C or any other shape with an open or slotted ring, and it can be placed around the battery while hugging its contour and incorporating the machining allowances thereof, and therefore the diameter variations.

The intermediate part and the ends of the branches of that C-shaped sleeve are then provided with lugs, for example the lugs designated by references 11, 12 and 13.

Each lug of the sleeve is provided with a passage hole 14, 15 and 16 for a screw for attaching that sleeve on the corresponding flange of the power section of the underwater craft.

Those holes, for example the holes 14, 15 and 16, of the end lugs 11, 12 and 13 of the branches of the C-shaped sleeve have a dimension larger than the diameter of the corresponding attaching screw.

In fact, those holes 14, 15 and 16 can be oblong holes also allowing the sleeve and the entire attaching device to absorb the machining allowances of the battery.

Thus, the sleeve has a certain flexibility making it possible to adjust it to the diameter of the thermal battery and the attachment holes thereof have a shape and/or size making it possible to react the machining allowances of the battery and to maintain a rigid and robust attachment of the battery on the flange without play.

One can then see that such a structure has a certain number of advantages, in particular in terms of its reliability and ease of use and implementation.

Of course, other embodiments can also be considered.

The invention claimed is:

1. A system for attaching a thermal battery to a flange of a power supply section of an underwater craft, said system comprising a fixing sleeve configured to be arranged around and fixed to the thermal battery, and the fixing sleeve provided with fixing lugs comprising holes for passage of screws configured to attach to the flange, each corresponding hole of the holes having an axis surrounded by the corresponding hole, wherein the fixing sleeve is in a shape of a C, the fixing sleeve comprising an intermediate part, a first branch and a second branch, the first branch being on one side of the intermediate part and the second branch being on another side of the intermediate part, the intermediate part, the first branch and the second branch each comprising the fixing lug, which is projected outward from an outer contour of the C of the fixing sleeve and configured to fix the fixing sleeve to the flange, wherein the fixing sleeve comprises a central axis, surrounded by the outer contour of the C of the fixing sleeve, and wherein the axis of each of the corresponding holes is parallel to the central axis of the fixing sleeve.

2. The system according to claim 1, wherein the holes of the fixing lugs of the C-shaped sleeve have a dimension larger than a diameter of the screws configured to attach the fixing sleeve on the flange.

3. The system according to claim 2, wherein the holes of the fixing lugs are oblong holes.

4. The system of claim 1, wherein said underwater craft is a torpedo.

5. A method of attaching a thermal battery to a flange of a power supply section of an underwater craft comprising attaching a system to said underwater craft;

the system comprising a fixing sleeve configured to be arranged around and fixed to the thermal battery, and the fixing sleeve provided with fixing lugs comprising holes for passage of screws configured to attach to the flange, each corresponding hole of the holes having an axis surrounded by the corresponding hole, wherein the fixing sleeve is in a shape of a C, the fixing sleeve comprising an intermediate part, a first branch and a second branch, the first branch being on one side of the intermediate part and the second branch being on another side of the intermediate part, the intermediate part, the first branch and the second branch each comprising the fixing lug, which is projected outward from an outer contour of the C of the fixing sleeve and configured to fix the fixing sleeve to the flange, wherein the fixing sleeve comprises a central axis, surrounded by the outer contour of the C of the fixing sleeve, and wherein the axis of each of the corresponding holes is parallel to the central axis of the fixing sleeve.

6. An underwater craft comprising:
a power supply section comprising a flange;
at least one thermal battery; and
means attaching the at least one thermal battery to the flange of the power supply section, said means comprising a system, a fixing sleeve of which being arranged around each of the at least one thermal battery;

the system comprising the fixing sleeve configured to be arranged around and fixed to the thermal battery, and the fixing sleeve provided with fixing lugs comprising holes for passage of screws configured to attach to the flange, each corresponding hole of the holes having an axis surrounded by the corresponding hole, wherein the fixing sleeve is in a shape of a C, the fixing sleeve comprising an intermediate part, a first branch and a second branch, the first branch being on one side of the intermediate part and the second branch being on another side of the intermediate part, the intermediate part, the first branch and the second branch each comprising the fixing lug, which is projected outward from an outer contour of the C of the fixing sleeve and configured to fix the fixing sleeve to the flange, wherein the fixing sleeve comprises a central axis, surrounded by the outer contour of the C of the fixing sleeve, and wherein the axis of each of the corresponding holes is parallel to the central axis of the fixing sleeve.

7. The underwater craft of claim 6, consisting of a torpedo.

8. The underwater craft of claim 6, wherein said means further comprises screws passing through the holes of the fixing lugs and attaching the fixing sleeve on the flange of the power supply section.

* * * * *